United States Patent
Darling et al.

(10) Patent No.: US 11,831,054 B2
(45) Date of Patent: Nov. 28, 2023

(54) METHOD OF MAINTAINING HEALTH OF A FLOW BATTERY

(71) Applicant: United Technologies Corporation, Hartford, CT (US)

(72) Inventors: Robert Mason Darling, South Windsor, CT (US); Michael L. Perry, Glastonbury, CT (US)

(73) Assignee: RTX Corporation, Waltham, MA (US)

( * ) Notice: Subject to any disclaimer, the term of this patent is extended or adjusted under 35 U.S.C. 154(b) by 2176 days.

(21) Appl. No.: 14/888,099

(22) PCT Filed: May 3, 2013

(86) PCT No.: PCT/US2013/039410
§ 371 (c)(1),
(2) Date: Oct. 30, 2015

(87) PCT Pub. No.: WO2014/178874
PCT Pub. Date: Nov. 6, 2014

(65) Prior Publication Data
US 2016/0056487 A1    Feb. 25, 2016

(51) Int. Cl.
*H01M 8/18*    (2006.01)
*H01M 8/20*    (2006.01)
(Continued)

(52) U.S. Cl.
CPC ..... *H01M 8/04798* (2013.01); *H01M 8/0444* (2013.01); *H01M 8/04313* (2013.01);
(Continued)

(58) Field of Classification Search
CPC ......... H01M 8/04798; H01M 8/04313; H01M 8/0444; H01M 8/04694; H01M 8/188; H01M 8/20
See application file for complete search history.

(56) References Cited

U.S. PATENT DOCUMENTS 4,159,366 A * 6/1979 Thaller ................. H01M 8/188
                                                                         429/101
4,407,902 A   10/1983 Kummer et al.
(Continued)

FOREIGN PATENT DOCUMENTS

CN   102859775   1/2013
CN   103000927   3/2013
(Continued)

OTHER PUBLICATIONS

International Search Report for PCT Application No. PCT/US2013/039410 dated Sep. 5, 2013.

*Primary Examiner* — Ula C Ruddock
*Assistant Examiner* — Frank A Chernow
(74) *Attorney, Agent, or Firm* — Carlson, Gaskey & Olds, P.C.

(57) ABSTRACT

A method of maintaining health of a flow battery includes determining an average oxidation state of a common electrochemically active elemental specie in first and second fluid electrolytes on, respectively, a positive side and a negative side of an electrochemical cell of a flow battery, and adjusting the average oxidation state in response to the average oxidation state deviating from a predefined average oxidation state value.

19 Claims, 1 Drawing Sheet

(51) Int. Cl.
  *H01M 8/04*       (2016.01)
  *H01M 8/04791*    (2016.01)
  *H01M 8/04313*    (2016.01)
  *H01M 8/04694*    (2016.01)
  *H01M 8/0444*     (2016.01)

(52) U.S. Cl.
  CPC ....... *H01M 8/04694* (2013.01); *H01M 8/188* (2013.01); *H01M 8/20* (2013.01); *H01M 2220/10* (2013.01); *Y02E 60/50* (2013.01)

(56) References Cited

U.S. PATENT DOCUMENTS

| | | |
|---|---|---|
| 2004/0256247 A1 | 12/2004 | Carson et al. |
| 2010/0092813 A1 | 4/2010 | Sahu |
| 2010/0330451 A1 | 12/2010 | Shinozaki et al. |
| 2013/0084506 A1 | 4/2013 | Chang et al. |

FOREIGN PATENT DOCUMENTS

| | | |
|---|---|---|
| JP | 7-192748 | 7/1995 |
| JP | H07192748 | 7/1995 |
| JP | 2000030721 | 1/2000 |
| JP | 2003157883 | 5/2003 |
| JP | 2003303611 | 10/2003 |
| JP | 2008544444 | 12/2008 |
| WO | 1990003666 | 4/1990 |
| WO | 0215317 | 2/2002 |
| WO | 20060135958 | 12/2006 |

\* cited by examiner

METHOD OF MAINTAINING HEALTH OF A FLOW BATTERY

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a method of maintaining health of a flow battery that includes determining an average oxidation state of a common electrochemically active elemental specie in first and second fluid electrolytes on, respectively, a positive side and a negative side of an electrochemical cell of a flow battery, and adjusting the average oxidation state in response to the average oxidation state deviating from a predefined range of average oxidation state values.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
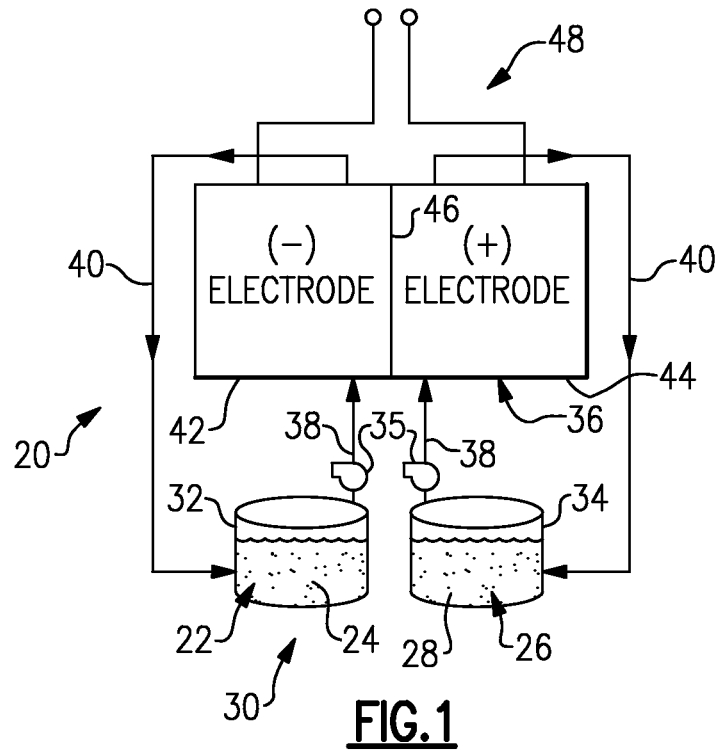
FIG. 1 illustrates an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 that has an electrochemically active specie 24 that functions in a redox pair with regard to an additional fluid electrolyte 26 that has an electrochemically active specie 28. The electrochemically active species 24/28 are common and are based on vanadium, iron, or chromium, for example. That is, in one example, the electrochemically active species 24/28 are differing oxidation or valence states of vanadium, and in another example the electrochemically active species 24/28 are differing oxidation or valence states of iron, and in another example the electrochemically active species 24/28 are differing oxidation or valence states of chromium. The fluid electrolytes 22/26 are liquid solutions that include the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34 and pumps 35.

The fluid electrolytes 22/26 are delivered from the first and second vessels 32/34, using the pumps 35, to at least one cell 36 of the flow battery 20 through respective feed lines 38. The fluid electrolytes 22/26 are returned from the cell 36 to the vessels 32/34 via return lines 40. The feed lines 38 and the return lines 40 connect the vessels 32/34 with first and second electrodes 42/44 of the cell. Multiple cells 36 can be provided as a stack.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. The bipolar plates can be carbon plates, for example. It is to be understood, however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be an ionic-exchange membrane, an inert micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

The flow battery 20 can experience self-discharge reactions. For example, self-discharge can occur when electrochemically active species 24/28 in the fluid electrolytes 22/26 permeate through the electrolyte separator layer 46. Permeation is not desirable but can occur since the electrolyte separator layer 46 is not a perfect barrier to the transport of the fluid electrolytes 22/26. Additionally, the electrochemically active species 24/28 can diffuse through the electrolyte separator layer 46 due to the concentration gradient of the different species that exists across the separator layer 46. Furthermore, as is the case in any battery, undesirable side reactions can also occur, which can result in the evolution of hydrogen or oxygen, especially in aqueous electrolytes, and these adverse side reactions on one electrode can also result in the oxidation or reduction of the electrochemically active species 24/28 on the opposite electrode. Over time, these reactions can cause an imbalance between the electrochemically active species 24/28 that debits the performance and maximum energy capacity of the flow battery 20. Moreover, such an imbalance can indicate poor health of the flow battery 20, as well as a need to rebalance the electrochemically active species 24/28.

Figure 2:
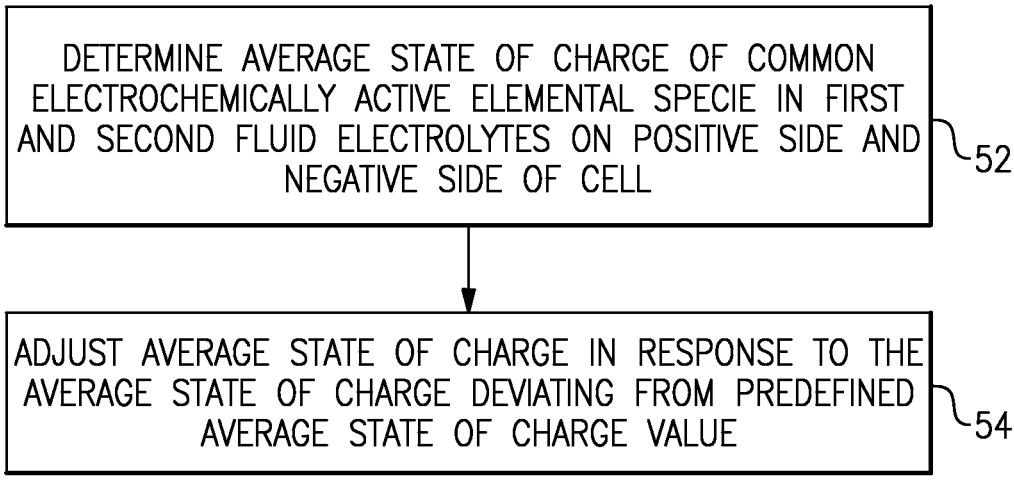
FIG. 2 illustrates an example method of maintaining health of a flow battery.

FIG. 2 shows an example method 50 of maintaining health of the flow battery 20. For example, the health of the flow battery 20 can be represented by an average oxidation state of the electrochemically active species 24/28. The average oxidation state provides a convenient, single value that is a good indicator of the health of the fluid electrolytes 22/26 and, thus, the flow battery 20.

As shown, the method 50 generally includes a determination step 52 and an adjustment step 54, although it is to be understood that the steps 52/54 can be utilized in combination with other steps or procedures as may be appropriate. The determination step 52 includes determining an average oxidation state of the electrochemically active species 24/28 in the fluid electrolytes 22/26. The adjustment step 54 includes then adjusting the average oxidation state in response to the average oxidation state deviating from a predefined range of average oxidation state values.

The predefined average oxidation state value can be a single value or a value range. The average oxidation state of the electrochemically active species 24/28 is then adjusted if it deviates from the single value or outside of the value range. For instance, the value range can be based upon the type of common electrochemically active species 24/28. In a further example, the value range can be +/−10% of the average oxidation state when the common electrochemically active species 24/28 are fully balanced. For vanadium, the fully balanced average oxidation state is +3.5 based upon the use of $V^{2+}/V^{3+}$ and $V^{4+}/V^{5+}$ (which can also be denoted as V(ii)/V(iii) and V(iv)/V(v), although the valences of the vanadium species with oxidation states of 4 and 5 are not necessarily 4+ and 5+) as the electrochemically active species 24/28. For example, if the electrolyte solution is aqueous sulfuric acid, then the V(iv)/V(v) species will be present as $VO^{2+}$ and $VO_2^+$, respectively.

The average oxidation state of the electrochemically active species 24/28 can be determined either directly or indirectly. If determined directly, the average oxidation state can be determined from measurements of molar concentrations of different valence states of the electrochemically active species 24/28. In one example based on vanadium as the common electrochemically active species 24/28, the valence states include $V^{2+}/V^{3+}$ and $V^{4+}/V^{5+}$. In one further example, the molar concentrations of the different valence states of the electrochemically active species 24/28 can be obtained using an optical detector device that collects molar concentration measurements of the electrochemically active species 24/28 in one or both of the vessels 32/34 using optical measurements. For example, the optical detector device utilizes light to detect molar concentration. Once the molar concentrations are obtained, the average oxidation state can be determined as a function of the molar concentrations divided by a total molar amount of the electrochemically active species 24/28. In one example based upon vanadium, the average valence state can be determined according to equation I:

$$\overline{v} = \frac{(2c_{2+} + 3c_{3+})V_- + (4c_{4+} + 5c_{5+})V_+}{N_{T,0}} \quad \text{Equation I}$$

In Equation I, $\overline{v}$ represents the average oxidation state, $c_{2+}$ represents the concentration of V(ii), $c_{3+}$ represents the concentration of V(iii), $c_{4+}$ represents the concentration of V(iv), $c_{5+}$ represents the concentration of V(v), and $N_{T,0}$ represents the total moles of the electrochemically active species 24/28. Similarly, the average oxidation state can be determined for an electrochemically active specie based on iron or chromium or other common specie.

The average oxidation state can alternatively be determined by directly measuring the concentrations of the different valence states using a titration technique, although the titration technique is not a real-time measurement and may, therefore, potentially introduce a time lag.

Alternatively or in addition to determining the average oxidation state directly, the average oxidation state can be determined indirectly from other properties of the fluid electrolytes 22/26. For example, measurements can be collected of conductivity, density, viscosity or combinations thereof of the fluid electrolytes 22/26. The conductivity, density and/or viscosity can be correlated experimentally to the average oxidation state of the electrochemically active species 24/28. Thus, these indirect measurements can be used to determine the average oxidation state or alternatively to verify direct measurements.

Once the average oxidation state is known, the average oxidation state can be adjusted if it deviates from the predefined average oxidation state value at the adjustment step 54. For example, if the average oxidation state is outside of the predefined average oxidation state value or value range, the average oxidation state is adjusted back to an acceptable level, for example.

Any of several techniques can be used to adjust the average oxidation state, depending upon the determined average oxidation state in the method 50. In one example, if the average oxidation state is too high, a reducing agent can be added to the second fluid electrolyte 26 on the positive side of the cell 36 to reduce the valence state of the electrochemically active specie 28 in the second fluid electrolyte 26. In some examples, the reducing agent is an acid, such as oxalic acid or formic acid. Additionally, or alternatively, an alcohol can be used as the reducing agent. In one example based upon oxalic acid, the oxalic acid reacts with the electrochemically active specie 28 to thus reduce the average valence state. A byproduct of the reaction is the generation of carbon dioxide, which is not harmful to the flow battery 20. Thus, the use of oxalic acid additionally provides the benefit of avoiding the generation of toxic chemicals or chemicals that would otherwise debit the performance of the flow battery 20.

If the average oxidation state is too low, an oxidizing agent can be added to the first fluid electrolyte 22 on the negative side of the cell 36 to increase valence state of the electrochemically active specie 24. For example, the oxidizing agent includes oxygen gas, such as air, and/or hydrogen peroxide. In one example based upon air, the air can be introduced and exposed to the first fluid electrolyte 22 simply by opening the vessel 32 to permit entry of air. In another example, the first fluid electrolyte 22 can be agitated within the vessel 32 or pumped using the pump 35 to increase exposure. Additionally or alternatively, air or oxygen gas can be bubbled through the first fluid electrolyte 22 in the vessel 32 to further increase exposure to the first fluid electrolyte 22.

In further examples, deviation of the average oxidation state from the predefined average oxidation state value or value range is indicative of poor health of the flow battery 20. Thus, there may be a need to adjust how the flow battery 20 is operated in order to mitigate or reduce change in the average oxidation state in the future. For example, the side reactions that tend to cause a shift in the average oxidation state can be caused by high over-potentials or exceeding maximum voltages in the flow battery 20 and thus promote these adverse side reactions. To mitigate these side reactions, the charge capacity of the flow battery 20 can be reduced in response to the average oxidation state deviating from the predefined average oxidation state value or value range. By reducing such charge capacity, lower over-potentials can be obtained, which can facilitate avoidance of future deviations of the average oxidation state from the predefined average oxidation state value or value range.

Additionally, if the flow battery 20 is known to have a tendency to creep towards an average oxidation state that is too high or too low, the average oxidation state can be initially set to a correspondingly lower or higher level in order to extend a period of time before having to adjust the average oxidation state. For instance, the average oxidation state can initially be set to a relatively high level in response to an expectation that the average oxidation state will creep to a lower value that eventually falls below the predefined average oxidation state value or value range.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of maintaining health of a flow battery, the method comprising:
    (a) determining an average oxidation state of a common electrochemically active elemental specie in first and second fluid electrolytes on, respectively, a positive side and a negative side of an electrochemical cell of a flow battery; and
    (b) adjusting the average oxidation state in response to the average oxidation state deviating from a predefined average oxidation state value to be either higher or lower than the predefined average oxidation state value in response to an expectation that the average oxidation state will creep toward the predefined average oxidation state value.

2. The method as recited in claim 1, wherein the common electrochemically active elemental specie is selected from the group consisting of vanadium, iron, and chromium.

3. The method as recited in claim 1, wherein said step (a) includes directly determining the average oxidation state from concentrations of different valence states of the common electrochemically active elemental specie in first and second fluid electrolytes.

4. The method as recited in claim 3, wherein said step (a) includes determining the average oxidation state as a function of molar concentrations of the different valence states divided by a total molar amount of the common electrochemically active elemental specie.

5. The method as recited in claim 1, wherein said step (b) includes adding a reducing agent to the second fluid electrolyte on the positive side to reduce a valence state of the common electrochemically active elemental specie in the second fluid electrolyte.

6. The method as recited in claim 5, wherein the reducing agent includes an acid.

7. The method as recited in claim 5, wherein the reducing agent includes oxalic acid.

8. The method as recited in claim 5, wherein the reducing agent includes formic acid.

9. The method as recited in claim 5, wherein the reducing agent includes an alcohol.

10. The method as recited in claim 1, wherein said step (b) includes adding an oxidizing agent to the first fluid electrolyte on the negative side to increase a valence state of the common electrochemically active elemental specie in the first fluid electrolyte.

11. The method as recited in claim 10, wherein the oxidizing agent includes oxygen gas.

12. The method as recited in claim 10, wherein the oxidizing agent includes air.

13. The method as recited in claim 10, wherein the oxidizing agent includes hydrogen peroxide.

14. The method as recited in claim 1, wherein the predefined average oxidation state value is an average oxidation state range.

15. The method as recited in claim 1, wherein said step (a) includes collecting measurements representing concentrations of different valence states of the common electrochemically active elemental specie in first and second fluid electrolytes.

16. The method as recited in claim 15, wherein the measurements include concentration measurements.

17. The method as recited in claim 15, wherein the measurements are selected from the group consisting of optical measurements, conductivity measurements, density measurements, viscosity measurements and combinations thereof.

18. The method as recited in claim 1, further comprising reducing a charge capacity of the flow battery in response to the average oxidation state deviating from the predefined average oxidation state value.

19. The method as recited in claim 1, wherein the flow battery comprises:
    the electrochemical cell including a first electrode, a second electrode spaced apart from the first electrode and an electrolyte separator layer arranged between the first electrode and the second electrode, and
    a supply/storage system external of the electrochemical cell, the supply/storage system including first and second vessels fluidly connected with the electrochemical cell.

* * * * *